United States Patent [19]

Victorius

[11] Patent Number: 5,061,387

[45] Date of Patent: Oct. 29, 1991

[54] AQUEOUS GEL SYSTEM OF PARTIALLY METHYLATED MELAMINE-FORMALDEHYDE RESIN AND POLYVINYL ALCOHOL

[75] Inventor: Claus Victorius, Media, Pa.

[73] Assignee: Conoco Inc., Ponca City, Okla.

[21] Appl. No.: 642,110

[22] Filed: Jan. 16, 1991

[51] Int. Cl.$^5$ .............................................. E21B 43/22
[52] U.S. Cl. .............................. 252/8.554; 252/8.551; 523/130; 166/270; 166/273; 166/274; 166/294; 166/295; 166/300
[58] Field of Search ............... 166/270, 274, 295, 300, 166/294, 273; 252/8.551, 8.554; 523/130

[56] References Cited

U.S. PATENT DOCUMENTS

| | | | |
|---|---|---|---|
| Re. 31,748 | 11/1984 | Block | 252/8.51 |
| 4,018,286 | 4/1977 | Gall et al. | 166/295 |
| 4,385,155 | 5/1983 | Michaels | 252/8.51 |
| 4,547,297 | 10/1985 | Block | 252/8.51 |
| 4,618,434 | 10/1986 | Blouin | 252/8.51 |
| 4,643,255 | 2/1987 | Sandiford et al. | 166/295 |
| 4,664,194 | 5/1987 | Marrocco | 166/295 |
| 4,673,038 | 6/1987 | Sandiford et al. | 523/130 |
| 4,772,641 | 9/1988 | Meltz et al. | 523/130 |
| 4,787,451 | 11/1988 | Mitchell | 166/295 |
| 4,859,717 | 8/1989 | Hoskin et al. | 523/130 |
| 4,903,767 | 2/1990 | Shu et al. | 166/270 |
| 4,964,461 | 10/1990 | Shu | 166/270 X |
| 5,015,400 | 5/1991 | Shu | 252/8.554 |

*Primary Examiner*—Robert L. Stoll
*Assistant Examiner*—Chhaya Sayala

[57] ABSTRACT

A stable aqueous gel is formed from a polyvinyl alcohol or vinyl alcohol copolymer and a partially methylated melamine-formaldehyde resin in the presence of a pH regulating agent which provides an initial acid pH during the formulation of the gel.

17 Claims, No Drawings

AQUEOUS GEL SYSTEM OF PARTIALLY METHYLATED MELAMINE-FORMALDEHYDE RESIN AND POLYVINYL ALCOHOL

BACKGROUND OF THE INVENTION

The advantages of using gel forming compositions for controlling the permeability of underground formations during water flooding and chemical flooding operations are well-known in the art. These plugging techniques are also used during well workovers, for example, to plug leaks in well casings or to temporarily plug wells, in fracture treatments, to consolidate unconsolidated formations, and to correct the injection profile of a well by sealing high-permeability streaks so that flooding fluids will enter the formation in a more desirable front.

It is desirable to provide improved gel forming compositions for carrying out the above procedures and for other uses in petroleum production.

PRIOR ART

U.S. Pat. No. 4,018,286 issued to James W. Gall, et al., discloses a method for plugging underground formations using a gel which may be prepared by cross-linking polyvinyl alcohol with a crosslinking agent at an acid pH of 3–7. Crosslinking agents disclosed are multivalent metal cations complexed with a retarding anion selected from acetates, phosphates, tartrate, and citrate.

U.S. Pat. No. 4,643,255 and U.S. Pat. No. 4,673,038 both issued to Sandiford, et al., disclose a gel-forming composition comprising polyvinyl alcohol and an aldehyde useful for retarding the flow of fluids in high permeability channels.

U.S. Pat. No. 4,664,194 issued to Matthew L. Marroco discloses polyvinyl alcohol-aldehyde gels useful for retarding the flow of water in subterranean formations.

U.S. Pat. No. 4,772,641 issued to Clifford N. Meltz, et al., discloses an aqueous gel-forming composition comprising melamine, formaldehyde, and a sulfurous acid salt. A gel-modifying agent such as polyvinyl alcohol may be added to the composition.

U.S. Pat. No. 4,787,451 issued to Thomas O. Mitchell discloses a gel-forming composition which proceeds under all pH conditions and does not require a catalyst, comprising a crosslinkable polymer such as polyvinyl alcohol, an aminoplast resin such as partially methylated melamine-formaldehyde and water. The composition is used for closing pores in permeable zones of a hydrocarbonaceous fluid bearing formation.

THE INVENTION

The invention is directed to aqueous solutions which form stable aqueous gels comprising a polyvinyl alcohol or a vinyl alcohol copolymer, a partially methylated melamine-formaldehyde resin, and a pH regulating agent which provides an initial acid pH during the formation of the gels.

In one aspect of the invention, the aqueous gel forming solutions contain a gelation retarding agent.

In another aspect, the invention is directed to the use of the aqueous gel forming solutions of the invention for sealing hydrocarbon formations.

DETAILED DESCRIPTION OF THE INVENTION

The polymers used in the aqueous gel forming solutions of the invention are polyvinyl alcohol and water soluble copolymers of vinyl alcohol and up to 20 percent comonomers. A wide variety of polymerizable materials may be used as comonomers, including such compounds as methyl acrylate, methyl methacrylate, acrylamide, methacrylic acid, acrylic acid, vinyl pyridine, and 1-vinyl-2 pyrrolidinone.

The preferred polymer for use in the aqueous gel forming solutions is polyvinyl alcohol. All water soluble grades of fully and partially hydrolyzed polyvinyl alcohol may be used. High molecular weight grades of polyvinyl alcohol having 4 percent aqueous solution viscosities greater than 40 centipoises are preferred because of their ability to yield rigid gels at lower resin solids contents. For low to moderate temperature applications (80°–140° F.), polyvinyl alcohol such as Elvanol 50–42 (Du Pont) which is an 88 percent hydrolyzed polyvinyl alcohol is preferred because it can be dissolved in cold water by stirring alone. For high temperature applications (greater than 180° F.), a fully hydrolyzed polyvinyl alcohol such as Elvanol HV (Du Pont) is preferred because its more hydrophilic character prevents or reduces syneresis of the aqueous gels at these temperatures. Syneresis is the phenomenon in which an aqueous gel contracts and squeezes out some of the liquid phase. This loss of liquid adversely affects the properties of the gel and, if continued, can totally destroy the usefulness of the gel.

Polyvinyl alcohols are available commercially and may be obtained over a range of molecular weights and degree of hydrolysis. Copolymers of vinyl alcohol and various comonomers are also available. The copolymers are prepared by the known standard method of reacting vinyl acetate with the desired comonomers in the presence of a free radical initiator. The product copolymer is hydrolyzed in methanol using sodium methylate as a catalyst. The methods of preparation of the polyvinyl alcohols and vinyl alcohol copolymers are well-known in the art and do not constitute a part of the invention.

The polymers employed in the aqueous gel forming solutions preferably have a high (weight average) molecular weight, at least about 30,000, preferably at least about 100,000 and more preferably from about 150,000 to about 250,000. The amount of polymer used in the solution will vary from about 2.0 to 8.0 weight percent based on the total solution. A more preferred amount of polymer is between about 2.5 and about 5.0 weight percent.

In the process of gelling the aqueous gel forming solutions of the invention, the polyvinyl alcohol polymer or vinyl alcohol copolymer is reacted with a partially methylated melamine-formaldehyde resin in an acidic aqueous medium, usually at ambient temperature. The melamine-formaldehyde resin is formed as a reaction product of melamine and formaldehyde. In this reaction, hydrogens attached to the amino nitrogens in the melamine react with the formaldehyde to form methylol groups. The melamine-formaldehyde resins so prepared may be further reacted (methylated) with methanol which etherifies the methylol groups to form methoxymethyl groups. The degree of methylation of the melamine-formaldehyde resin is controlled by limiting the amount of methanol used in this reaction. The partially methylated melamine-formaldehyde resins used in the compositions of the invention will vary in their amount of methylation depending on the particular use of the composition. For example, for casing patching and fracture plugging applications at low to moderate temperatures, partially methylated melamine-formaldehyde resins having lower degrees of methylation are generally preferred because their high reactivity permits the attainment of the desired short gel time (6-8 hours at formation temperature) for these services. For channel blocking and high temperature operations, more highly methylated less reactive grades of partially methylated melamine-formaldehyde resins may be used. Procedures for the preparation of melamine-formaldehyde resins are well-known in the art and do not constitute a part of the invention. Many melamine-formaldehyde resins which are partially methylated are available commercially, in addition to those specifically disclosed herein.

The degree of methylation of the partially methylated melamine-formaldehyde resins employed should be at least high enough to obtain commercially acceptable storage stability of the resin and at most low enough to maintain the water solubility of the resin. American Cyanamid's Cymel 385 is an example of a resin having a low degree of methylation but still acceptable stability. Cymel 350 is an example of a resin having a relatively high degree of methylation while maintaining complete water solubility. The water insoluble essentially fully methylated melamine-formaldehyde resins, such as American Cyanamid's Cymel 303 and Monsanto's Resimene 747, are not used in the aqueous gel forming solutions of the invention because they are not sufficiently reactive to form useful gels with polyvinyl alcohol at the relatively moderate acidity levels (pH of 5 to 6) attainable in most oil-bearing rock substrates.

The mole ratio of melamine to formaldehyde in the partially methylated melamine-formaldehyde resins used in the aqueous gel forming solutions of the invention is less than 1:6 and preferably is from about 1:5.35 to about 1:5.65.

The ratio of moles of melamine per mole of formaldehyde of a fully methylolated melamine-formaldehyde resin may be calculated from the degree of polymerization (DP) of the resin, defined as the average number of melamine units per molecule. For example, Cymel 350 resin (American Cyanamid) has a DP of 1.6 and may therefore be represented as a mixture of 6 dimers (11 moles formaldehyde/2 moles melamine) and 4 monomers (6 moles formaldehyde/1 mole melamine), as shown by the following calculation:

$$DP = \frac{(6 \times 2) + (4 \times 1)}{10} = 1.6$$

The mole ratio of melamine to formaldehyde is calculated by ratioing the total moles of each component in the resin, as follows:

Melamine:Formaldehyde = $(6 \times 2) + (4 \times 1):(6 \times 11) + (4 \times 6)$

= 16:90

= 1:5.625

Cymel 373 resin (American Cyanamid) has a DP of 2.3 and may therefore be represented as a mixture of 7 dimers and 3 trimers (16 moles formaldehyde/3 moles melamine). Based on a similar calculation as above, this resin has a melamine/formaldehyde ratio of 1:5.435. Similarly, a resin having a DP of 2.6 would have a melamine/formaldehyde ratio of 1:5.385.

The amount of partially methylated melamine-formaldehyde resin used in the aqueous gel forming solutions of the invention may vary from about 0.8 to about 8.0 weight percent of resin solids, based on the total solution. More usually, the amount of resin employed will be between about 1.3 and about 5.0 weight percent. In the solution, the ratio of polyvinyl alcohol polymer or vinyl alcohol copolymer to partially methylated melamine-formaldehyde resin may vary from about 75:25 to about 45:55. However, preferably, this ratio will be from about 70:30 to about 50:50.

The partially methylated melamine-formaldehyde resins contain only small amounts free formaldehyde, usually less than 2.5 percent and not more than 3.0 percent. This low level of free formaldehyde content provides resins which have very low acute toxicity, which is important in the handling required for use of the resins in the aqueous gel forming solutions of the invention.

The level of free formaldehyde introduced into the aqueous gel forming solutions by use of these resins is very low. Usually, it ranges from less than 120 ppm to not more than about 700 ppm. A low formaldehyde content of solutions injected into underground formations is highly desirable from the standpoint of minimizing possible contamination of groundwaters.

The reaction of the polyvinyl alcohol polymer or vinyl alcohol copolymer and the partially methylated melamine-formaldehyde resin requires an acid medium. The initial pH of the reaction mixture during the formation of the gel may be any pH which is less than 7.0 but greater than 2.0; however, usually the pH will vary from between about 2.5 to about 6.5. Preferred pH values are from about 2 8 to about 6 0.

The required initial pH for gel formation may be provided with a wide variety of water soluble pH regulating materials. These include such compounds as acetic acid, formic acid, lactic acid, phosphoric acid, esters of the above acids such as methyl acetate, ethyl formate, ethyl lactate, ethyl acetate, ethylene diacetate, triethyl phosphate, and the like, 2-chloroacetamide, and alkali metal salts of phosphoric acid, fluoroboric acid, and sulfamic acid.

The amount of pH regulating agent used is that required to effect formation of aqueous gels at the application temperature in the time period desired, which may range from a few hours to as long as several weeks. Usually, the pH regulating agent is provided in an amount between 0.01 and about 5.0 weight percent based on the total solution. Preferably, the amount of pH regulating agent varies from about 0.05 to about 3.0 weight percent.

The rate of gelling of the aqueous gel forming solutions of the invention will vary depending on the particular components of the solution and the temperature of the environment in which the gelling takes place. A certain amount of time is required to prepare the gel forming solution, inject the solution into the well and from the well into the desired location or locations in a formation. If the solution begins to gel before this time period has elapsed, it may become impossible to place the solution at the desired location.

As stated previously, the pH regulating agent is provided to achieve gel times ranging usually from about 6-8 hours up to several weeks at the application temperature. The pH regulating agent must also overcome the neutralizing effect on the gelling solution of calcium and magnesium carbonates, which are commonly present in rock matrices. Accordingly, different types of catalysts are used for different application temperature ranges. For example, at low temperatures in the range of 80°-90° F., the aqueous gel forming solution is acidified and buffered with 0.5 to 1.0 weight percent monobasic sodium phosphate and the pH is then adjusted to the desired value with an acid such as acetic or phosphoric or a base such as sodium hydroxide. At moderate temperatures, between about 100°-140° F., a water soluble ester may be used to generate carboxylic acid on hydrolysis at the application temperature. Ethyl formate may be used for the 100°-120° F. range, whereas, methyl acetate is preferred at 130°-140° F. A relatively large amount of the ester from 0.5 to 3 weight percent based on the total solution may be required to counteract the neutralizing effect of the dolomite.

At high temperatures, from about 180°-250° F., a water soluble amide of a strong acid may be used to generate the (acidic) ammonium salt of the acid on hydrolysis, or sodium fluoroborate may be used to generate hydrofluoric acid on hydrolysis. 2-chloroacetamide provides the most desirable gel properties and is the preferred high temperature pH regulating agent. The amount of such agent used is generally in the range of 0.05 to 1.0 weight percent based on the total solution.

The rate of gelling obtained with pH regulating agents may be reduced and controlled by adding a water soluble gelation-retarding agent to the aqueous gel forming solution. The retarding agents used are basic salts whose function is to neutralize the first amounts of acid formed in the solution by hydrolysis of the catalyst. This retards lowering of the pH and increases the gelling time. Typical retarding agents are sodium bicarbonate and sodium carbonate; however, alkali metal salts of other weak acids may also be used for this purpose. The amount of retarding agent used will vary depending on the particular aqueous gel forming solution but may constitute from 0 to about 0.5 weight percent based on the total solution and, more usually, between 0 and about 0.2 weight percent. The use of gelation-retarding agents is particularly advantageous in conjunction with high temperature pH regulating agents like 2-chloroacetamide and sodium fluoroborate to prolong the somewhat short gel times obtained with these agents alone.

Fresh water is preferred as the solvent for the aqueous gel forming solutions. While up to about 3 percent total dissolved salts may be tolerated in the water with proper formulation at lower temperatures, application at higher temperatures and the use of more saline brine and straight seawater at any temperature generally cause syneresis of the gels. Hardness of the water, per se, has little effect on the properties and stability of the polyvinyl alcohol or vinyl alcohol copolymer/partially methylated melamine-formaldehyde resin gels, because neither the polymer nor the resin interacts significantly with polyvalent ions like calcium and magnesium.

The aqueous gel forming solutions of the invention are operable to form gels over temperatures ranging from 70° F. or below up to 210° F. or higher.

In the preparation of the aqueous gel forming solutions, the components of the solutions may be combined in any manner. However, usually, the polymer and the resin are each dissolved in water and the solutions are combined; with the pH regulating agent being added to the combination. If a gelation-retarding agent is required, it will usually be added to the mixture prior to or along with the pH regulating agent.

The aqueous gel forming solutions find use in petroleum formations over a wide range of application conditions for sealing high water permeability zones, plugging casing leaks, and consolidating loose rock and sand formations. The composition of the solution for each particular application will depend on the temperature of the area which is to be treated and the extent of the zone or formation to be sealed. The components of the gel forming solution are preferably combined prior to their introduction downhole; however, if desired, the various ingredients of the solution may be separately introduced to the desired gelling location. For example, solutions of the polymer and resin may be introduced separately, followed by the pH regulating agent; or the pH regulating agent may be included with either of the solutions. The amount of gel forming solution used in the sealing process is determined by the size of the zone to be treated.

The treatment is usually designed to penetrate and fill the fissures and pores in the rock zone from about 5 feet up to about 100 feet from the injection wellbore, more typically up to about 20 feet from the wellbore.

The time required for the aqueous gel forming solution to gel will vary from about 4 hours to as long as 30 days depending on the composition of the solution and the temperature of the formation. For each application, the components of the aqueous gel forming solution are selected so that gelling does not commence until the solution is properly placed in the formation.

The following examples are presented in illustration of various aspects of the invention.

The properties of the partially methylated melamine-formaldehyde resins used in the examples are summarized in the following table:

| PMMF Resin | D.P. | M/F Mole Ratio | Degree of Methylation |
| --- | --- | --- | --- |
| Cymel 350 | 1.6 | 1:5.63 | Moderate |
| Cymel 373 | 2.3 | 1:5.44 | Low |
| Cymel 385 | 2.1 | 1:5.48 | Very Low |
| Resimene 730 | 1.8 | 1:5.56 | Moderate-Low |
| Resimene 735 | 2.1 | 1:5.48 | Moderate-Low |

EXAMPLE 1

A 5 percent resin solids (R.S.) solution of "Elvanol" 50-42 (molecular weight 193,000) 88 percent hydrolyzed PVA, having a 4 percent aqueous solution viscosity of about 47 cps, was prepared by stirring 35 g of "Elvanol" 50-42 into 665 g of tap water at room temperature overnight. A 50 percent R.S. solution of Resimene 735 PMMF resin was prepared by mixing 75 g of Resimene 735 (Monsanto; 80 percent solids in isopropanol; maximum free formaldehyde content=2.0%) with 45 g of deionized water.

A gelling solution containing the PVA (polyvinyl alcohol) and PMMF (partially methylated melamine-formaldehyde) resin in a 60/40 by weight resin ratio was prepared by diluting 16.20 g of the 5 percent "Elvanol" 50-42 solution with 10.00 g of tap water, adding 1.08 g of the 50 percent R.S. Resimene 735 solution, acidifying the solution with 0.38 g of 1 percent by weight aqueous acetic acid, and adding 2.34 g additional tap water to dilute the solution to 4.5 percent total resin solids (T.R.S.). The solution was clear and fluid, had a pH of 5.24, and a free formaldehyde content no greater than 450 ppm.

Samples of the solution in 10 ml serum bottles sealed with rubber septa were heated in water baths thermostatically maintained at 85° and 130° F. At 85° F., the solution gelled in 5 days and formed a rigid gel in 7 days. At 130° F., the solution gelled some time after 4 hours and formed a rigid gel in 24 hours. Both gels remained rigid, without syneresis, to the end of the 30-day test period.

EXAMPLE 2

A gelling solution containing "Elvanol" 50-42/Cymel 385 PMMF resin in a 60/40 by weight resin ratio at 4.5 percent T.R.S. and 1 percent $NaH_2PO_4.H_2O$ was prepared by diluting 2.62 g of Cymel 385 (American Cyanamid; 79 percent solids in water; maximum free formaldehyde content=0.5%) with 34.00 g of tap water, adding 62.10 g of the 5 percent "Elvanol"50-42 solution of Example 1 and 11.50 g of a 10 percent aqueous solution of monobasic sodium phosphate monohydrate, acidifying the solution to pH 5.0 with 2.34 g of 3 percent by weight aqueous acetic acid and diluting it with 2.44 g of tap water. The solution was clear, had a free formaldehyde content no greater than 115 ppm, and had a Brookfield viscosity, measured with a Model DV-II viscometer using a "Small Sample Adapter" and No. 18 spindle rotated at 30 rpm, of 14 centipoises.

Samples of the solution in sealed 10 ml serum bottles were immersed in an 83° F. water bath. The gel time of the solution, determined by measuring the viscosity of samples at hourly intervals, was found to be about 6 hours. The solution formed a rigid gel in 24 hours at 83° F., which remained rigid and free of syneresis on aging a total of 63 days at 83° F.

A Berea core was treated with the gelling solution to see if gel would form in a porous matrix. The test temperature was 83° F. and 300 psi back-pressure was maintained inside the core throughout the treatment sequences. Five pore volumes (67 ml total) of the gelling solution were injected through a brine saturated core at a rate of 0.5 ml/min (8.5 ft/day). The gel times of the injected solution and the effluent from the core (5th pore volume throughput) were 7.5 and 8.0 hours, respectively, at 83° F.

After the injection, the gelling solution was flushed out of the flow lines to the core face. The core was shut-in for 6 days to allow gel to form in the core. The brine permeability of the core prior to the treatment was 545 millidarcy (md). The brine permeability after the shut-in was 0.002 md indicating that a very low permeability gel plug formed in the core.

A reservoir rock was treated with the gelling solution to determine if gel would form under reservoir conditions. The test temperature and pressure were 83° F. and 300 psi. Six pore volumes (70 ml) of the gelling formulation were injected through a brine saturated Ford Geraldine core at a rate of 0.5 ml/min (10.5 ft/day). The Ford Geraldine core was more reactive than the Berea core that was used in the above example. Ford Geraldine rock contained 7 weight percent calcite and had a cation exchange capacity (CEC) of 1.3 meq/100 grams while Berea core had 3 weight percent dolomite and a CEC of 0.35 meq/100 grams. The gel times of the injected solution and the effluent from the core (6th pore volume throughput) were 6.7 and 15.8 hours, respectively, at 83° F.

The flow lines were flushed and the core was shut-in for five days. After the shut-in, the brine permeability of the core was 0.06 md. This compared with brine permeability of 8.5 md before the treatment. The results indicate that a low permeability gel plug formed in the reactive reservoir rock.

EXAMPLE 3

A 50 percent R.S. solution of Cymel 373 PMMF resin was prepared by mixing 6.00 g of Cymel 373 (American Cyanamid; 85 percent solids in water; maximum free formaldehyde content=3.0%) with 4.20 g of tap water.

A solution containing "Elvanol" 50-42/Cymel 373 in a 60/40 by weight resin ratio was prepared by mixing 72.00 g of the 5 percent "Elvanol" 50-42 solution of Example 1 with 28.20 g of tap water and 4.80 g of the 50 percent R.S. solution of Cymel 373 in tap water. To 45.50 g of this solution was added 6.50 g of an 8 percent by weight solution of ethyl formate in tap water to yield a 5 percent T.R.S. gelling solution containing 1 percent ethyl formate. The solution was clear, had a free formaldehyde content no greater than 700 ppm, and had a Brookfield viscosity at 25° C., measured as in Example 2, of 17 centipoises.

The gel time of the solution at 120° F. was determined by means of the Brookfield Model DV-II viscosimeter with Small Sample Adapter and No. 18 spindle by covering the solution with a thin layer of "Nujol" mineral oil to reduce water evaporation from the sample, rotating the spindle at 0.6 rpm, and circulating water at 120° F. from a constant temperature circulating bath through the Small Sample Adapter jacket. The viscometer output was recorded by means of a strip chart recorder. The gel time was taken as the recorded time when the viscosity of the solution started rising rapidly to >1,000 cps and was 10½ hours.

A sample of the solution sealed in a 10 ml serum bottle and immersed in a 120° F. water bath set to a rigid gel in one day. The pH of the gel was 3.33 after 3 days at 120° F. and 2.86 after 20 days at 120° F. The gel was still rigid and free of syneresis after aging 60 days at 120° F.

A dolomite core that had been hydraulically fractured was treated with the gelling solution to evaluate permeability reduction and gel strength. The fracture faces of the core were acid etched to increase the fracture permeability.

The test temperature was 120° F. and 300 psi was maintained on the core throughout the treatment sequences. Six pore volumes (90.0 ml) of gelling solution were injected through the core at a rate of 0.5 ml/min. The gel time of the injected solution and the effluent from the core (6th pore volume throughput) were 7.2 and 8.3 hours, respectively, at 120° F.

The flow lines were flushed and the core was shut-in for 6 days. Gel formed in the fractured core. The core permeability was reduced from 90 to 0.002 md. The yield gradient is defined as the pressure gradient where the permeability reduction of the gel begins to break down. The yield gradient of the gel in the fracture was determined to be 1,500 psi/ft indicating that a high-strength gel formed in the core.

EXAMPLE 4

A 10 percent solution of "Elvanol" HV (molecular weight 176,000) fully hydrolyzed PVA, having a 4 percent aqueous solution viscosity of about 60 cps, was prepared by stirring 150 g of "Elvanol" HV into 1,350 g of deionized water in a resin kettle equipped with a stirrer, thermometer, reflux condenser, and heating mantle, heating the mixture with stirring to 90° C., holding it at this temperature for about 1 hour to dissolve the "Elvanol" HV completely, cooling the solution to room temperature, and adding 2.0 g of 1 Normal aqueous sodium hydroxide to bring the pH from 5.7 to 8.0. The solution was slightly hazy and extremely viscous.

A 50 percent R.S. solution of Resimene 730 PMMF resin was prepared by mixing 4.00 g of Resimene 730 (Monsanto: 90 percent solids in isopropanol: maximum free formaldehyde content=1.5%) with 3.20 g of deionized water.

A 5 percent T.R.S. solution of "Elvanol" HV/ Resimene 730 (50/50 by weight resin ratio), containing 0.05 percent sodium fluoroborate, was prepared by mixing 10.0 g of the 10 percent "Elvanol" HV solution with 25.5 g of tap water, 2.0 g of the 50 percent R.S. Resimene 730 solution and 2.5 g of an 0.8 percent solution of sodium fluoroborate (NaBF$_4$) in tap water. The solution had a free formaldehyde content no greater than 420 ppm and had a Brookfield viscosity at 25° C., measured as in Example 2, of 13 cps.

An 8 g sample of the solution was sealed in a 10 ml serum bottle with a silicone rubber septum and crimped-on aluminum seal. The air space in the bottle was purged with nitrogen by inserting a fine hypodermic needle into it through the septum and alternatively evacuating the bottle with house vacuum and filling it with nitrogen three times. The sample was heat-aged in a circulating air oven at 210° F. The solution gelled after 7 days and formed a rigid gel after 14 days at 210° F. On aging an additional 6 weeks at 210° F., the gel remained rigid and showed only very slight syneresis (<5 percent by volume of serum).

EXAMPLE 5

A 55 percent aqueous solution of Cymel 350 PMMF resin was prepared by dissolving 2.20 g of Cymel 350 (American Cyanamid; 97 percent nonvolatile minimum; maximum free formaldehyde content=2.5 percent) in 1.80 g of deionized water.

Solutions containing "Elvanol" HV/Cymel 350 in a 60/40 by weight resin ratio were prepared by mixing 11.88 g portions of the 10 percent aqueous "Elvanol" HV solution of Example 4 with 1.44 g portions of the 55 percent Cymel 350 solution and 25.18 g portions of the following brines:

1. A 3 percent by weight solution of sodium chloride in deionized water (hardness of zero).
2. A.S.T.M. seawater, prepared by dissolving 41.95 g of A.S.T.M. D-1141-52 sea-salt in deionized water to make 1,000 ml of solution (hardness of 6,510 mg calcium carbonate per liter).

To 17.50 g portions of these solutions were added 2.50 g portions of 4 percent by weight solutions of ethyl formate in the respective brines to yield 4.5 percent T.R.S. gelling solutions containing 0.5 percent ethyl formate and having a free formaldehyde content no greater than 450 ppm. The brines constituted 73 percent by weight of the total solvent in both solutions.

Samples of the two solutions sealed in 10 ml serum bottles and immersed in a 120° F. water bath formed rigid gels free of syneresis in 3 days. After aging 30 days at 120° F., both gels were still essentially rigid and contained a slight amount (<5 percent by volume) of serum.

These results show that the PVA/PMMF gel system of the invention is operable in low salinity brines at low to moderate temperatures. Hardness of the brine per se does not have a deleterious effect on gel stability, as seen from the comparable results obtained in 3% TDS seawater having a hardness of 4,745 mg calcium carbonate per liter and in sodium chloride solution having a hardness of zero.

EXAMPLE 6

A 50 percent R.S. solution of Cymel 385 PMMF resin was prepared by mixing 6.00 g of Cymel 385 with 3.48 g of tap water.

A solution containing "Elvanol" 50-42/Cymel 385 in a 50/50 by weight resin ratio was prepared by mixing 60.00 g of the 5 percent "Elvanol" 50-42 solution in tap water of Example 3 with 21.50 g of tap water and 6.00 g of the 50 percent R.S. solution of Cymel 385 in tap water. To 28.00 g portions of this solution were added 4.00 g portions of 8 percent solutions of the following esters in tap water: (1) ethyl formate, (2) ethyl lactate, (3) methyl acetate. This yielded 6 percent T.R.S. gelling solutions containing 1 percent ester catalyst and having a free formaldehyde content no greater than 190 ppm. The solutions were clear and had Brookfield viscosities at 25° C., measured as in Example 2, of 18 centipoises.

Samples of the three solutions sealed in 10 ml serum bottles and immersed in a 140° F. water bath had the following gel times, set times (time to set to a rigid gel), pH after aging 3 days, and stability:

|  | Sample 1 | Sample 2 | Sample 3 |
| --- | --- | --- | --- |
| Catalyst | Ethyl formate | Ethyl lactate | Methyl acetate |
| Gel time | 1 hour | 5 hours | 8 hours |
| Set time | 2 hours | 7 hours | 1 day |
| pH after 3 days | 2.85 | 4.30 | 4.57 |
| Stability, 2 months at 140° F. | Rigid gel free of syneresis | Rigid gel with a slight wobble; no syneresis | Rigid gel with slight (<5% by volume) serum |

These results show that the gel times and set times of PVA/PMMF resin gels can be varied to suit different application requirements by the use of ester catalysts having different hydrolysis rates, without significantly affecting the rigidity and stability of the resulting gels.

EXAMPLE 7

A 50 percent solution of Cymel 350 PMMF resin was prepared by dissolving 2.00 g of Cymel 350 in 2.00 g of tap water.

A 5 percent solution of "Elvanol" HV/Cymel 350 (50/50 by weight resin ratio), containing 0.55 percent 2-chloroacetamide and 0.045 percent sodium bicarbonate retarder, was prepared by mixing 10.00 g of the 10 percent aqueous "Elvanol" HV solution of Example 4 with 24.80 g of tap water, 2.00 g of the 50 percent Cymel 350 solution, 2.75 g of an 8 percent solution of 2-chloroacetamide in tap water and 0.45 g of a 4 percent solution of sodium bicarbonate in tap water. The solution had a Brookfield viscosity at 25° C., measured as in Example 2, of 12 cps and a free formaldehyde content no greater than 625 ppm.

An 8 g sample of solution was sealed in a 10 ml serum bottle with a silicone rubber septum and a crimped-on aluminum seal. The air space in the bottle was purged with nitrogen as in Example 4. The sample was heat-aged in a circulating air oven at 210° F. The solution gelled in 7 hours and set up to a rigid gel in 2 days. After 3 days, the gel had a pH of 3.31. The gel remained rigid and free of syneresis on aging 3 months at 210° F.

A second gel forming solution analogous to the above but containing 0.50 percent 2-chloroacetamide and no sodium bicarbonate retarder was prepared by mixing 10.00 g of the 10 percent aqueous "Elvanol" HV solution with 25.50 g of tap water, 2.00 g of the 50 percent Cymel 350 solution and 2.50 g of an 8 percent solution of 2-chloroacetamide in tap water. An 8 g sample of the solution sealed in a 10 ml serum bottle, purged with nitrogen and heat-aged at 210° F. as above gelled in 3 hours and set up to a rigid gel in 2 days. The pH of the gel was 3.29 after 3 days at 210° F. The gel remained rigid and free of syneresis on aging 3 months at 210° F.

A sand pack was loaded into a coreflood vessel with 1500 psi confining pressure. The sand pack was saturated with a high salinity brine (10 percent TDS). A back-pressure of 500 psi was maintained on the system throughout the evaluation. The coreflood vessel temperature was raised to 210° F. The sand pack pore volume and initial permeability were measured to be 30.4 ml and 3480 md.

The sand pack was preflushed with 5 pore volumes of 0.5 percent NaCl brine at a rate of 1 ml/min to displace the high salinity formation water. The sand pack was then treated with 5 pore volumes of the second gel solution at a rate of 1 ml/min. After the gel solution injection was complete, the flow lines to the sand pack were flushed with Blandol and the core was shut-in for 90 hours.

A sample of the treatment solution and an effluent sample from the sand pack during the injection of the 5th pore volume were placed in sealed ampules at 210° F. Both samples set up to a rigid gel within 48 hours.

After the 90-hour shut-in, the permeability of the sand pack was measured to be 74 md indicating that gel had formed in the sand pack. The overall permeability reduction was 97.9 percent.

EXAMPLE 8

A 50 percent R.S. solution of Resimene 730 PMMF resin was prepared by mixing 2.00 g of Resimene 730 with 1.60 g of tap water.

A gelling solution containing "Elvanol" 50-42/ Resimene 730 in a 60/40 by weight resin ratio at 4.5 percent T.R.S. and 1 percent $NaH_2PO_4.H_2O$ buffer adjusted to pH 6 was prepared by mixing 21.60 g of the 5 percent "Elvanol" 50-42 solution of Example 3 with 8.00 g of tap water, 1.44 g of the 50 percent R.S. Resimene 730 solution and 4.00 g of a 10 percent aqueous solution of monobasic sodium phosphate monohydrate, adjusting the pH of the solution to 6.0 with 1N sodium hydroxide and adding additional tap water to bring the total weight of the solution to 40.00 g. The solution had a Brookfield viscosity at 25° C., measured as in Example 2, of 14 cps and a free formaldehyde content no greater than 300 ppm.

A sample of the solution sealed in a 10 ml serum bottle and immersed in an 83° F. water bath gelled in 8 days and set to a rigid gel in 10 days. After aging 30 days at 83° F., the gel was still essentially rigid and free of syneresis and had a pH of 6.00.

EXAMPLE 9

The gelling properties of two "Elvanol" grades of 88 percent hydrolyzed PVA of lower molecular weight were compared with those of "Elvanol" 50-42. The properties of the three PVAs are set forth in Table 1.

TABLE 1

| Elvanol | Viscosity, cps | Molecular Weight |
|---------|----------------|------------------|
| 50-05   | 5.5            | 48,000           |
| 52-22   | 23             | 131,000          |
| 50-42   | 47             | 193,000          |

The three PVAs were evaluated with Cymel 373 at a 60/40 PVA/PMMF resin ratio, using 1 percent ethyl formate as the pH regulator at 120° F. and 1 percent methyl acetate as the pH regulator at 140° F. The lower MW PVAs were tested at different TRS levels, with the highest one chosen to give about the same initial viscosity as that of the 5 percent TRS "Elvanol" 50-42/Cymel 373 (60/40) control. The results are presented in Table 2:

TABLE 2

| PVA "Elvanol" | Percent TRS | pH Regulator[1] | Initial Viscosity cps | Test Temperature °F. | Gel Time (hours) | Maximum Gel Rigidity[2] | 71 Days Stability[2] |
|---|---|---|---|---|---|---|---|
| 51-05 | 12.0 | 1% Ethyl Formate | 16.9 | 120 | 7 | Rigid/1 day | Rigid gel |
| 51-05 | 9.0 | 1% Ethyl Formate | 8.8 | 120 | 8 | Rsw/1 day | Rsw gel |
| 51-05 | 6.0 | 1% Ethyl Formate | 4.4 | 120 | — | Did not gel | Fluid solution |
| 52-22 | 6.5 | 1% Ethyl Formate | 18.2 | 120 | <6 | Rigid/6 hrs | Rigid gel |
| 52-22 | 5.0 | 1% Ethyl Formate | 10.2 | 120 | ≦6 | Rsw/8 hrs | Rsw gel |
| 50-42 | 5.0 | 1% Ethyl Formate | 15.8 | 120 | <6 | Rigid/6 hrs | Rigid gel |
| 51-05 | 12.0 | 1% Methyl Acetate | 16.9 | 140 | >8 | Rigid/1 day | Rigid gel |
| 51-05 | 9.0 | 1% Methyl Acetate | 8.8 | 140 | >8 | Soft/1 day | Soft gel |
| 51-05 | 6.0 | 1% Methyl Acetate | 4.4 | 140 | — | Did not gel | Fluid solution |
| 52-22 | 6.5 | 1% Methyl Acetate | 18.2 | 140 | >8 | Rigid/1 day | Rsw gel |
| 52-22 | 5.0 | 1% Methyl Acetate | 10.2 | 140 | >8 | Soft/1 day | Soft gel |
| 50-42 | 5.0 | 1% Methyl Acetate | 15.8 | 140 | >8 | Rsw/1 day | Semi-rigid gel |

[1]Weight percent based on total solution.
[2]Rsw means rigid with slight wobble.

The results of this example show that useful PVA/PMMF resin gels can be obtained from lower viscosity (molecular weight) grades of PVA by increasing TRS levels to obtain approximately equal initial solution viscosities in the 16–18 centipoise range. This requires a TRS level of 12 percent for the low MW "Elvanol" 51-05 and a TRS level of 6.5 percent for the intermediate MW "Elvanol" 52-22. The high MW "Elvanol" 50-42 is preferred because it provides equal gel properties at lower TRS levels and therefore lower cost.

EXAMPLE 10

A gelling solution containing Elvanol 50-42/Cymel 373 PMMF resin in a 70/30 by weight resin ratio at 4.5 percent TRS and percent $NaH_2PO_4.H_2O$ was prepared by diluting 1.27 g of Cymel 373 with 20.33 g of tap water, adding 50.40 g of the 5% "Elvanol" 50-42 solution of Example 1 and 8.00 g of a 10 percent aqueous solution of monobasic sodium phosphate monohydrate.

The solution was clear, had a pH of 5.3 and a maximum free formaldehyde content of 480 ppm.

Samples of the solution sealed in 10 ml serum bottles were immersed in water baths maintained at 85° F. and 130° F. At 85° F., the solution gelled in 2 days and formed a rigid gel in 3 days. At 130° F., the solution gelled in 4 hours and formed a rigid gel in 2 days. Both gels remained rigid, without syneresis, to the end of the 30-day test period.

EXAMPLE 11

A 50 percent R.S. solution of Cymel 385 PMMF resin was prepared by mixing 10.00 g of Cymel 385 with 5.80 g of tap water.

A stock solution containing "Elvanol" 50-42/Cymel 385 in a 60/40 by weight resin ratio and $NaH_2PO_4$ buffer was prepared by mixing 54.00 g of the 5 percent "Elvanol" 50-42 solution of Example 1 with 17.40 g of tap water, 3.60 g of the 50 percent R.S. solution of Cymel 385 in tap water and 10.00 g of a 10 percent solution of monobasic sodium phosphate monohydrate in tap water.

A solution having a resin solids content of 4.5 percent, containing 1 percent of $NaH_2PO_4.H_2O$, and adjusted to pH 8 with sodium hydroxide was prepared by adding 2.82 g of 1 Normal aqueous sodium hydroxide to 37.40 g of the stock solution to bring its pH from 5.6 to 8.0 and then diluting the solution with 3.78 g of tap water. The diluted solution was clear and had a pH of 7.98.

A control gelling solution reproducing that of Example 2 was prepared by acidifying 42.50 g of the stock solution to pH 5.0 with 1.17 g of 3 percent by weight aqueous acetic acid and diluting it with 6.34 g of tap water. The diluted solution was clear, had a pH of 5.03, and had a gel time at 140° F., determined as in Example 3, of 500 minutes.

Samples of the two solutions sealed in 10 ml serum bottles were immersed in an 83° F. water bath. The pH 8 solution formed a slight precipitate but did not gel on aging 14 days at 83° F., when the test was terminated. The final pH of the solution was 7.58. The pH 5 control solution formed a firm white gel in 24 hours at 83° F. The gel was still firm and free of syneresis at the end of the 14 day test period and had a pH of 5.07.

The results of this example show that an initial acid pH is required for the gel forming solutions of the invention to set to a gel at low temperatures.

EXAMPLE 12

A 50% R.S. solution of Resimene 730 PMMF resin was prepared by mixing 10.00 g of Resimene 730 with 8.00 g of tap water.

A stock solution containing "Elvanol" 50-42/Resimene 730 in a 60/40 by weight resin ratio and $NaH_2PO_4$ buffer was prepared by mixing 54.00 g of the 5 percent "Elvanol" 50-42 solution of Example 1 with 17.40 g of tap water, 3.60 g of the 50 percent R.S. solution of Resimene 730 in tap water and 10.00 g of a 10 percent solution of monobasic sodium phosphate monohydrate in tap water.

A solution having a resin solids content of 4.5 percent, containing 1 percent of $NaH_2PO_4.H_2O$, and adjusted to pH 8 with sodium hydroxide was prepared by adding 2.88 g of 1 Normal aqueous sodium hydroxide to 37.40 g of the stock solution to bring its pH from 5.5 to 8.0 and then diluting the solution with 3.72 g of tap water. The diluted solution was clear and had a pH of 7.99.

A control gelling solution reproducing that of Example 8 was prepared by adding 0.33 g of 1 Normal aqueous sodium hydroxide to 37.40 g of the stock solution to bring its pH to 6.0 and then diluting the solution with 6.27 g of tap water. The solution was clear and had a pH of 6.01.

Samples of the two solutions sealed in 10 ml serum bottles were immersed in an 83° F. water bath. The pH 8 solution formed some precipitate but did not gel on aging 28 days at 83° F., when the test was terminated. The final pH of the solution was 7.36. The pH 6 control solution gelled after 10 days at 83° F. and set to a moderately firm gel in 14 days at 83° F. After aging 28 days at 83° F., the gel was still moderately firm and free of syneresis and had a pH of 5.98.

The results of this example show that even very slow gelling solutions of the invention having a pH just below 7, such as would be useful for sealing high water permeability zones at some distance from the injection well, require an initial acid pH for gel formation.

EXAMPLE 13

A stock solution containing "Elvanol" 50-42/Cymel 385 in a 50/50 by weight resin ratio was prepared by mixing 60.00 g of the 5 percent "Elvanol" 50-42 solution of Example 1 with 9.00 g of tap water and 6.00 g of the 50% R.S. Cymel 385 solution of Example 11.

A solution having a resin solids content of 6.0 percent, containing 1 percent of $NaH_2PO_4.H_2O$, and adjusted to pH 8 with sodium hydroxide was prepared by mixing 33.00 g of the stock solution with 4.40 g of a 10 percent solution of monobasic sodium phosphate monohydrate in tap water, adding 2.90 g of 1 Normal aqueous sodium hydroxide to bring the pH to 8.0 and then diluting the solution with 3.70 g of tap water. The diluted solution was clear and had a pH of 7.95.

A control gelling solution containing 1 percent of methyl acetate catalyst and reproducing Sample 3 of Example 6 was prepared by mixing 33.00 g of the stock solution with 11.00 g of a 4 percent solution of methyl acetate in tap water. The solution was clear, had an initial pH of 7.55, and had a gel time at 140° F., determined as in Example 3, of 9 hours.

Samples of the two solutions in 10 ml serum bottles were placed in a convection oven at 140° F. The pH 8 solution separated into a cloudy bottom layer and a clear top layer after 2 days at 140° F. After 3 days, the bottom layer had formed a gel plug occupying about half the volume of the sample while the top layer was clear and fluid. The pH of the sample was 6.96. The appearance of the sample was not changed substantially after 11 days at 140° F. when the test was terminated. The final pH of the sample was 6.57.

The control solution catalyzed with methyl acetate had formed a fairly firm white gel after 1 day at 140° F. which had a pH of 5.74. After 11 days at 140°, the gel was fairly firm and free of syneresis and had a pH of 4.72.

The results of this example in combination with those of Example 6 demonstrate the need for a pH regulating agent that imparts an initial acid pH to the gel forming solutions of the invention in order to obtain useful, syneresis-free gels having good stability. The good gel properties obtained in Example 10 at 130° F. in the presence of 1 percent $NaH_2PO_4.H_2O$ at pH 5.3 show that the presence of the sodium phosphate in the pH 8 solution of the present example did not cause its poor gelling behavior by some kind of salt effect occurring at a moderate temperature.

While certain embodiments and details have been shown for the purpose of illustrating the present invention, it will be apparent to those skilled in the art that various changes and modifications may be made herein without departing from the spirit or scope of the invention.

I claim:

1. An aqueous gel-forming solution comprising:
   (a) a polymer selected from the group consisting of water soluble polyvinyl alcohol and water soluble copolymers of vinyl alcohol,
   (b) a water soluble partially methylated melamine-formaldehyde resin,
   (c) a water soluble acidifying pH regulating agent which provides an initial acid pH of the solution during the formation of the gel,
   (d) a water soluble gelation retarding agent for reducing and controlling the rate of gelling, and
   (e) a major amount of water based on the total solution, said aqueous gel-forming solution having a maximum content of free formaldehyde of about 700 parts per million.

2. The solution of claim 1 in which the polymer is high molecular weight polyvinyl alcohol.

3. The solution of claim 2 in which the partially methylated melamine-formaldehyde resin has a degree of polymerization of about 1.6 to about 2.6 and a melamine-formaldehyde mole ratio in the range of 1:5.35 to 1:5.65.

4. The solution of claim 3 in which the pH regulating agent is selected from the group consisting of acetic acid, formic acid, lactic acid, phosphoric acid and water soluble esters thereof, 2-chloroacetamide, and alkali metal salts of phosphoric acid, fluoroboric acid, and sulfamic acid.

5. The solution of claim 1 in which the water soluble gelation retarding agent is selected from the group consisting of sodium bicarbonate and sodium carbonate.

6. An aqueous gel-forming solution comprising:
   (a) about 2.5 to about 5.0 weight percent of a polymer selected from the group consisting of water soluble polyvinyl alcohol and water soluble copolymers of vinyl alcohol,
   (b) about 1.3 to about 5.0 weight percent of a water soluble partially methylated melamine-formaldehyde resin,
   (c) about 0.05 to about 3.0 weight percent of a water soluble acidifying pH regulating agent which provides an initial pH of the solution during the formation of the gel of about 2.8 to about 6.0,
   (d) up to about 0.5 weight percent of water soluble gelation retarding agent for reducing and controlling the rate of gelling, and
   (e) a major amount of water based on the total solution, said gel-forming solution having a polymer to resin weight ratio of from about 70:30 to about 50:50 and a maximum content of free formaldehyde of about 700 parts per million.

7. The solution of claim 6 in which the polymer is a polyvinyl alcohol having a molecular weight of at least about 100,000.

8. The solution of claim 7 in which the partially methylated melamine-formaldehyde resin has a degree of polymerization of about 1.6 to about 2.6 and a melamine to formaldehyde mole ratio in the range of 1:5.35 to 1:5.65.

9. The solution of claim 8 in which the pH regulating agent is selected from the group consisting of acetic acid, formic acid, lactic acid, phosphoric acid and water soluble esters thereof, 2-chloroacetamide, and alkali metal salts of phosphoric acid, fluoroboric acid, and sulfamic acid.

10. A process for sealing a formation which comprises injecting into the formation an aqueous gel-forming solution comprising:
    (a) a polymer selected from the group consisting of water soluble polyvinyl alcohol and water soluble copolymers of vinyl alcohol,
    (b) a water soluble partially methylated melamine-formaldehyde resin,
    (c) a water soluble acidifying pH regulating agent which provides an initial pH of the solution during the formation of the gel of 2.5 to 6.5,
    (d) a water soluble gelation regarding agent, and
    (e) a major amount of water based on the total solution, said gel-forming solution having a maximum content of free formaldehyde of about 700 ppm, whereby a stable gel is formed in said formation.

11. The process of claim 10 in which the gel is used to shut off a permeable zone in the formation.

12. The process of claim 10 in which the gel is used to consolidate an unconsolidated formation.

13. The process of claim 10 in which the gel is used to plug leaks in a well casing.

14. The process of sealing a formation which comprises injecting into the formation an aqueous gel-forming solution comprising:
    (a) about 2.5 to about 5.0 weight percent of a polymer selected from the group consisting of water soluble polyvinyl alcohol and water soluble copolymers of vinyl alcohol,
    (b) about 1.3 to about 5.0 weight percent of a water soluble partially methylated melamine-formaldehyde resin,
    (c) about 0.05 to about 3.0 weight percent of a water soluble acidifying pH regulating agent which provides an initial pH of the solution during the formation of the gel of about 2.8 to about 6.0,
    (d) up to about 0.5 weight percent of a water soluble gelation retarding agent for reducing and controlling the rate of gelling, and
    (e) a major amount of water based on the total solution, said gel-forming solution having a polymer to resin weight ratio to from about 70:30 to about 50:50 and a maximum content of free formaldehyde of about 700 parts per million, whereby a stable gel is formed in said formation.

15. The process of claim 14 in which the gel is used to shut off a permeable zone in the formation.

16. The process of claim 14 in which the gel is used to consolidate an unconsolidated formation.

17. The process of claim 14 in which the gel is used to plug leaks in a well casing traversing said formation.

* * * * *